(12) United States Patent
Ray et al.

(10) Patent No.: US 7,311,313 B1
(45) Date of Patent: Dec. 25, 2007

(54) HANDS-FREE JOGGING STROLLER ADAPTOR WITH SHOCK ABSORBER

(76) Inventors: Sarah Joan Ray, 1638 Oak Ave., Los Altos, CA (US) 94024; Philip Stephen Fay, 1638 Oak Ave., Los Altos, CA (US) 94024

( * ) Notice: Subject to any disclaimer, the term of this patent is extended or adjusted under 35 U.S.C. 154(b) by 497 days.

(21) Appl. No.: 10/981,930

(22) Filed: Nov. 4, 2004

(51) Int. Cl.
*B62D 51/04* (2006.01)
(52) U.S. Cl. .................... 280/1.5; 280/47.38
(58) Field of Classification Search ............ 280/1.5, 280/288.4, 293, 727, 47.38, 47.11, 47.131, 280/DIG. 6; 224/184; 403/192
See application file for complete search history.

(56) References Cited

U.S. PATENT DOCUMENTS

| | | | |
|---|---|---|---|
| 4,236,723 A | 12/1980 | Lemmon | |
| 5,106,108 A | 4/1992 | Howell | |
| 5,375,861 A | 12/1994 | Gifford | |
| 5,385,355 A | 1/1995 | Hoffman | |
| 5,511,802 A | 4/1996 | Aitken | |
| 5,884,920 A | 3/1999 | Seto | |
| 6,039,333 A | 3/2000 | Hamblin | |
| 6,098,993 A | 8/2000 | Bellinson | |
| 6,131,917 A | 10/2000 | Walsh | |
| 6,139,033 A | 10/2000 | Western | |
| 6,349,949 B1 | 2/2002 | Gorringe | |

OTHER PUBLICATIONS

Freestride, L.L.C. Product Features. Copyright 2002. Available at <http://www.freestride.com/features.htm>. Submitted Reference Last Accessed on Nov. 3, 2004.

*Primary Examiner*—Tony Winner
(74) *Attorney, Agent, or Firm*—Carr & Ferrell LLP

(57) ABSTRACT

A hands-free jogging stroller adaptor apparatus with shock absorbing properties is provided. The adaptor allows a jogger to utilize a jogging stroller without interruption of natural arm and leg cross-motion as would occur when pushing the stroller with hands or forearms. Telescopic tubes are situated between a jogger and the stroller, the tubes being equipped with an intermediary shock absorber whereby the motion of the jogger will not cause uncomfortable 'bumping' of the stroller or a child inside. The adaptor is worn by a jogger through the use of a waist belt. The adaptor is attached to the stroller by means of an interlocking bayonet-cup fitting.

16 Claims, 4 Drawing Sheets

3A 280   270   160/ 170

3B 280   270

3C

HANDS-FREE JOGGING STROLLER ADAPTOR WITH SHOCK ABSORBER

BACKGROUND OF THE INVENTION

1. Field of the Invention

This invention relates to strollers for children and, more particularly, to jogging strollers used by a person while jogging, running, or brisk walking.

2. Description of the Background Art

Walking and running are excellent ways to maintain personal health. Physical, aerobic exercise coupled with the fresh-air offered by an outdoor environment can play a critical role in a healthy lifestyle. Parents, especially those of young children and infants, often find themselves faced with a choice between exercise and keeping watch over their children. This is a result of the fact that parents, in many instances, are forced to abandon their outdoor walking and running exercise regimen because the parent must stay at home to mind a young child not yet mature enough to be left alone or to actively participate in the parent's exercise routine.

An interim solution to this problem is the jogging stroller. For example, the "Baby Jogger®" first appeared in the marketplace in the early 1980s to allow parents to bring along their small children in a stroller while they exercised. Presently available jogging strollers suffer, however, from the disadvantage of causing the user—the jogger pushing the stroller—to break their natural running or walking rhythm. The break in this natural rhythm—the natural swinging of the jogger's arms in relation to their legs (e.g., right arm extension with the left leg followed by left arm extension with the right leg)—occurs as the jogger must push the jogging stroller in a desired direction and at a desired rate with one or both hands or forearms. By having one hand or forearm placed on, for example, a handlebar of the stroller, the jogger is unable to freely swing their arms in the aforementioned cross-patterned rhythmical movement with their legs during their running or walking routine. Running, jogging, and walking, therefore, becomes difficult, tedious, and potentially injurious when this normal cross-patterned movement of arms and legs is interrupted.

This interruption of cross-patterned movement is secondary, however, to the possibility of losing control of the jogging stroller and the child therein. Failure to properly maintain constant control over the jogging stroller can result in the jogging stroller accelerating faster than the user (e.g., rolling uncontrolled down a hill), the stroller tipping over, the stroller becoming unstable on certain road surfaces (e.g., loose gravel or dirt) or, in a worst case scenario, the stroller falling into road traffic putting the child inside the jogging stroller at incredible risk of injury. With the safety of a child in the jogging stroller being paramount, the disadvantages and discomfort caused by the interruption of a user's cross-patterned rhythm has often been seen as an unavoidable necessity.

Strollers that may allow a user to remove their hands or forearms from a handle bar or other steering mechanism through a 'hands free adaptor'—thereby allowing for natural hand-leg cross-rhythms—often rely on the jogger's body motion (e.g., moving forward) to push the stroller forward. These 'hands free adaptor' designs suffer from the fact that as the jogger's body (e.g., the jogger's hips or legs) pushes the stroller forward with each stride, there is a fraction of a second in between the jogger's strides—a pause—where the forward momentum of the stroller is interrupted. After the jogger takes each stride and lands on their opposite leg during walking or running, the stroller continues to be pushed forward by the jogger's body. This continued motion, however, is interrupted by the aforementioned pause that occurs between each stride of the jogger resulting in a 'bump' or 'clash of momentum' between the jogger and the stroller. This pattern repeats throughout the jogger's walking or running routine resulting in unsmooth and unnatural movement as well as a generally chaotic exercise experience for the jogger. The experience is no more enjoyable for the child in the stroller as they are constantly being jolted by the 'bump' or 'clash of momentum.' Any benefit enjoyed by the hands-free adaptor that allows for natural hand-leg rhythm is entirely discounted by the creation of an entirely new and potentially harmful problem in the form of bumping the jogging stroller and the child therein.

As such, there is a need in the art for a hands-free adaptor with shock absorbing properties that allows the jogger to engage in normal cross-patterned movement of arms and legs when taking a child along for a jog or walk in a jogging stroller without the risk of losing control of the jogging stroller.

SUMMARY OF THE INVENTION

In accordance with an exemplary embodiment of the present invention, a hands-free adaptor with shock absorbing properties is provided that allows a jogging stroller to be guided without the constant use of hands or forearms. The adaptor is comprised of two elongated, partially telescopic, spring-loaded tubes that attach to "snap-in" bayonet-style connectors fitted to a stroller handlebar and joined to a perpendicular tube that rests inside a neoprene-fabricated pocket. The pocket is sewn to the front of a neoprene-fabricated waist belt. A user guides the jogging stroller forward using momentum from the waist/hip area of their body. Using the natural energy and movement of the user's waist/hip area, the user is freed from otherwise constant use of arms and hands to guide the jogging stroller thereby allowing for the resumption of natural cross-rhythms between arms and legs. The spring-loaded tubes function as shock absorbers thereby absorbing excess momentum from the jogger that might otherwise result in a bump or clash of momentum between the jogger and the stroller.

DETAILED DESCRIPTION OF A PREFERRED EMBODIMENT

Figure 1:
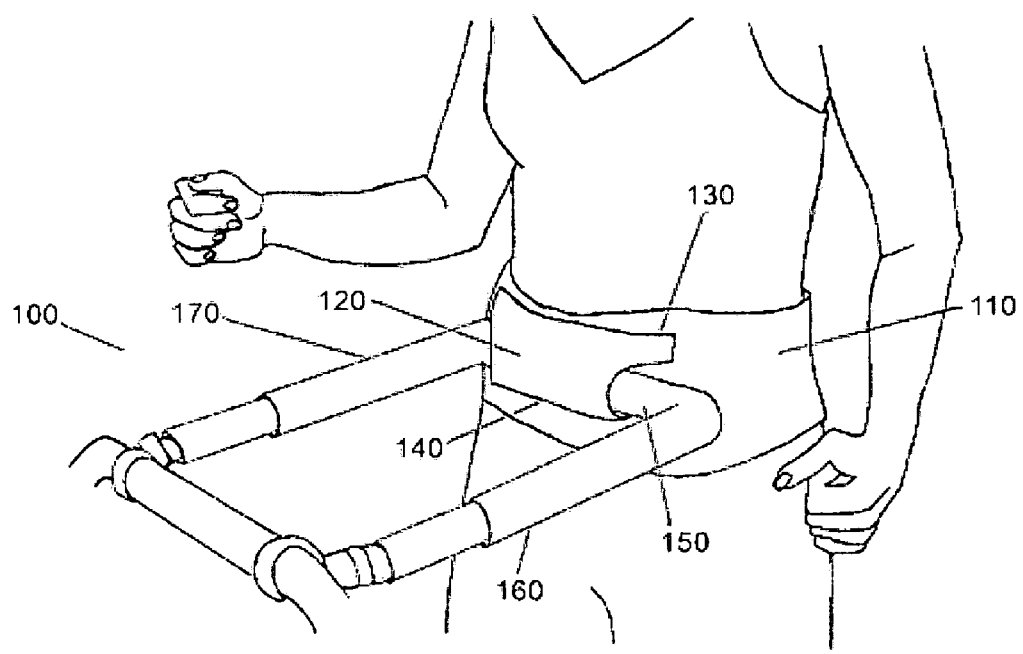
FIG. 1 is a perspective view illustrating an exemplary embodiment of the jogging stroller adaptor of the present invention.

In FIG. 1, an exemplary embodiment of a hands free jogging adaptor 100 of the present invention is provided. The jogging adaptor 100 comprises a wearable, adjustable, fabricated waist belt 110. The exemplary waist belt 110 comprises a neoprene-fabricated flap/pocket 120 located on a forward part of the waist belt 110. The forward part of the waist belt 110 is that part of the waist belt 110 that would be worn over a jogger's stomach or a front side of their hips.

The waist belt 110 can attach and be adjusted around the user's waist through, for example, Velcro®, but can also be attached or adjusted like a traditional belt worn with clothing or through any variety of snaps, zippers, or hooks and eyelets.

The flap/pocket 120 is, in one embodiment, permanently attached to the waist belt 110 on a first edge 130 of the flap/pocket 120. The flap/pocket 120 is non-permanently adhered to the waist belt 110 at a second edge 140 with a Velcro strip or some other means for removably adhering the flap/pocket 120 to the waist belt 110. For example, a series of snaps, eyelets and hooks, or a zipper would achieve the same effect. The first edge 130 of the flap/pocket 120 can be located on an upper portion or lower portion of the waist belt 110. Similarly, the second edge 140 can also be located either on the upper portion or the lower portion of the waist belt 110. In the present embodiment shown in FIG. 1, the first edge 130 is shown as being permanently affixed near the upper portion of the waist belt 110 while the second edge 140 is shown as being removably adhered near the lower portion of the waist belt 110.

The purpose of the flap/pocket 120 is to secure a horizontal tube portion 150 of the adaptor 100 close to the body. In that regard, the first edge 130 may be removably adhered to the waist belt 110 while the second edge 140 is permanently affixed to the waist belt 110. Some embodiments may also permanently affix both edges of the flap/pocket 120 to the waist belt 110 while other embodiments might provide for removable adherence of both edges to the waist belt 110. Any configuration may generally be utilized so long as the flap/pocket 120 allows for securing of the horizontal tube portion 150 to the waist belt 110. It is noted that the waist belt 110 and flap/pocket 120 can also be made from another flexible material without deviating from the scope of the present invention. The horizontal tube portion 150 offers stability as it adequately supports the movement that might be created as a result of a combination of jogger momentum with the various parts of the adaptor 100. Horizontal tube portion 150 can be hollow or solid as may be determined by individual material or cosmetic design requirements and/or limitations.

Figure 2:
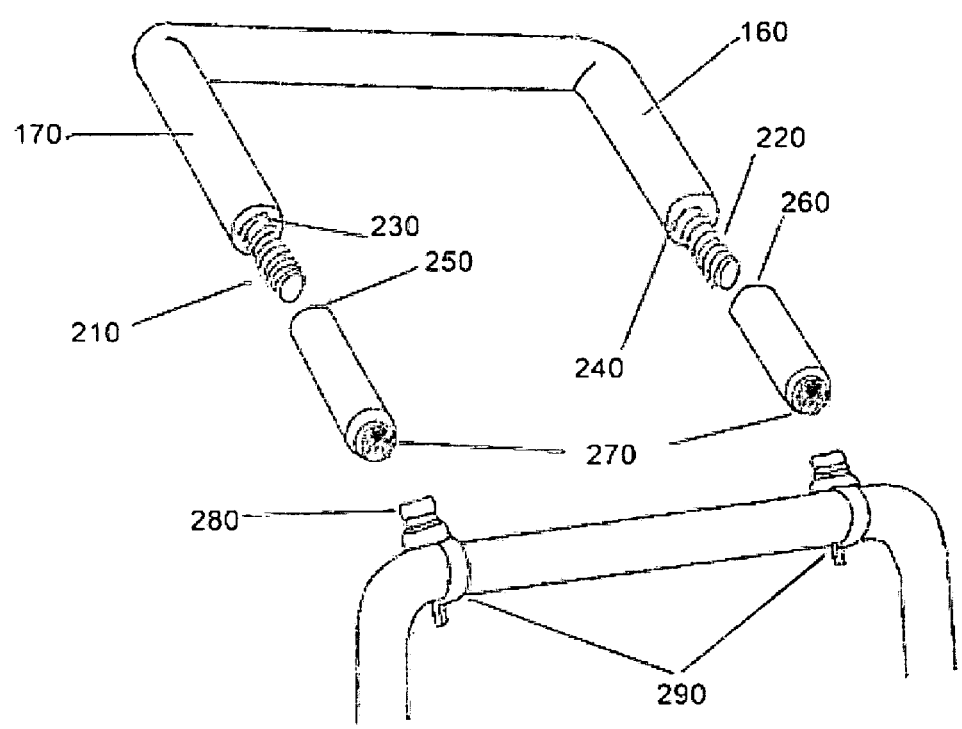
FIG. 2 is an exploded view of the jogging stroller adaptor of the present invention as shown in FIG. 1.
Figure 4:
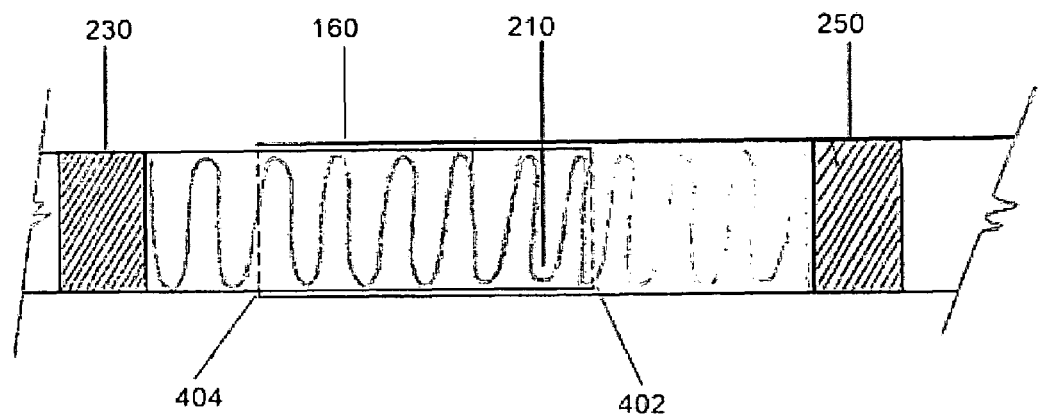
FIG. 4 shows the inner configuration of the jogging stroller adaptor of the present invention.

Perpendicularly coupled to the horizontal tube portion 150 securely enveloped inside the flap/pocket 120 of the waist belt 110 are two elongated tubes 160 and 170. These elongated tubes 160/170 are partially telescopic (i.e., they comprise a 'male' end and a 'female' end) and are loaded with a shock absorbing material as shown in FIGS. 2 and 4. Elongated tubes 160/170 may be of singular construction (e.g., a single apparatus) with horizontal tube portion 150 or may connect through any variety of means such as, for example, being 'snapped' together, joined through 'male' and 'female' ends, screwed together or affixed through the use of a kingpin-like device. The horizontal tube portion 150 and elongated tubes 160/170 may be constructed of identical material. Examples of such material include molded plastic or any variety of lightweight metals. The construction of the horizontal tube portion 150 and the elongated tubes 160/170 are limited in construction material only to the extent that such material is sturdy enough to transfer momentum from the jogger to the stroller without excessive bending or flexing or, more importantly, breaking.

Shock absorbers inside the elongated tubes 160/170 act, inter alia, as shock absorbers during forward movement of a jogger wearing the adaptor 100 and prevent the transfer of uneven and/or irregular kinetic energies from the user's body to a stroller mounted with the adaptor 100. By absorbing this excess energy, the jogger avoids 'bumping' the stroller as is described as being common in the prior art.

Referring now to FIG. 2, the elongated tubes 160/170 are exploded to reveal exemplary shock absorbers 210/220. The shock absorbers 210/220 can be steel springs or any other type of spring or shock absorber including, but not limited to, elastics or rubber material. The shock absorbers 210/220 can be adjustable with regard to tension thereby allowing for the jogger to adjust the transfer of energy between their body and the stroller as might be required dependent on the specific jogging velocity and physical makeup of the jogger. Both ends of shock absorbers 210/220 are held in place by stoppers 230-260 (stoppers 250/260 not being visible), which are also illustrated in FIG. 4.

The stoppers 230-260 can be constructed of a similar material as the elongated tubes 160/170 and horizontal tube portion 150 although the material of construction need not be identical. The stoppers 230-260 are limited in construction only to the extent the stoppers 230-260 prevent the shock absorbers 210/220 from becoming dislodged inside the elongated tubes 160/170. The stoppers 230-260, in addition to preventing the shock absorbers 210/220 from becoming dislodged within the elongated tubes 160/170 can also keep the shock absorbers 210/220 "charged," that is, the stoppers 230-260 can maintain an adequate spring rate, where the shock absorber material is a spring, to provide for a balance between preventing uneven and irregular transfers of kinetic energy from the user to the stroller while concurrently using that kinetic energy to guide a stroller forward without the use of hands or forearms. The stoppers 230-260, in that regard, can also be used to adjust tension as described infra. The stoppers 230-260 can be a part of the original molding of the elongated tubes 160/170 but can also be riveted, glued, or otherwise affixed to the interior of the elongated tubes 160/170 after molding of the elongated tubes 160/170.

In some embodiments, the elongated tubes 160/170 could run on intrinsic rails that accommodate the back-and-forth movement created by the user during walking or running movements. In an embodiment utilizing intrinsic rails, the outer surface of an inner elongated tube 160/170 (e.g., a male tube) is molded with convex ridges in a lengthwise pattern. The inner surface of an outer elongated tube 160/170 (e.g., a female tube), would be molded with concave ridges to accommodate the convex ridges of the male tubing so that the inner tube glides smoothly within the outer tube.

Each exposed end of the elongated tubes 160/170 features a molded cup 270. A bayonet fitting 280 that attaches the adaptor 100 to a stroller handlebar via a handlebar connector 290 has a molded surface that 'snaps' into the cup 270. This fitting 280 and connector 290 feature provide several important benefits. First, the fitting 280, in conjunction with connector 290, acts as a bearing allowing for up and down movement of the adaptor 100 against the handlebar. Second, the fitting 280, in conjunction with the connector 290, adjusts the angle of the adaptor 100 for varying heights of joggers using the adaptor 100. Third, if too much motion is applied in either a horizontal or vertical direction, the bayonet fitting 280 will "snap out," that is, it will detach, from the molded cup 270. This benefit is extremely important, for example, in an instance where the user might lose control of the stroller and would otherwise trip, fall, and suffer possible serious injury if still 'attached' to the heavier and lower center of gravity stroller.

The fittings 280 on the handlebar that connect the adaptor 100 to the stroller can comprise two separate ring-shaped, connectors 290 similar to those that might couple a brake handle to a bicycle handlebar. These connectors 290 can be held in place in a similar manner, for example, with a hexnut and screw. On the edge of each connector 290, and facing the user, is the bayonet fitting 280 for insertion into the elongated tubes 160/170 via the molded cup 270. The connector 290 can also be coupled to the stroller in a more permanent manner, for example, if the stroller happens to be sold in conjunction with the adaptor 100. In these instances, the connector 290 could be molded as a part of the handlebar of the stroller. Alternative embodiments of the present invention may utilize a different connection system that the present connector 290-molded cup 270 configuration.

Once the fittings 280 are inserted into the molded cup 270 of the elongated tubes 160/170, the adaptor 100 is ready for use.

Figure 3:
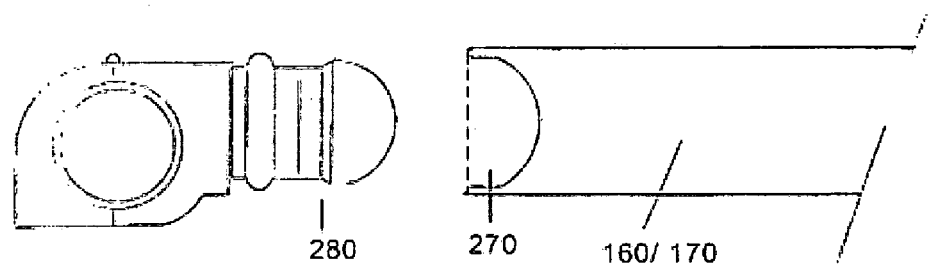
FIG. 3 shows the interaction of a bayonet-fitting end and a molded cup end in the stroller adaptor.
Figure 3:
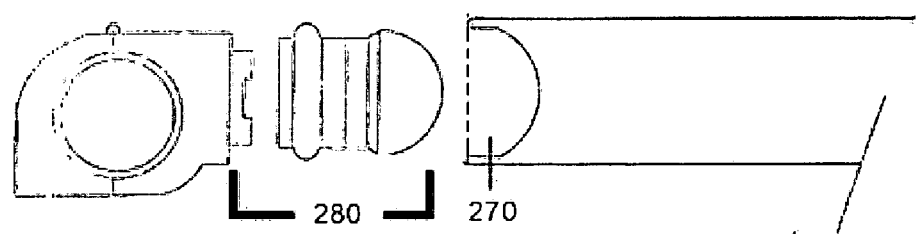
Figure 3:
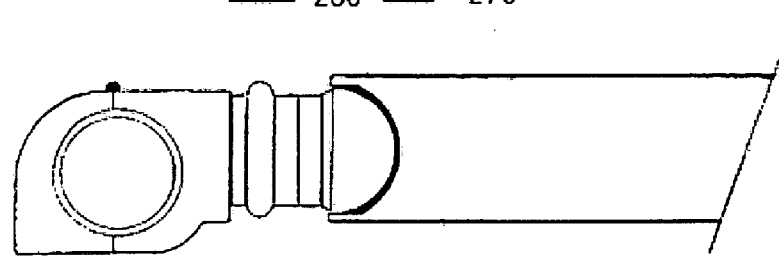

FIG. 3 shows more detailed views of the molded cup 270 and bayonet fitting 280 interaction of the adaptor 100. As shown in FIG. 3A, the bayonet fitting 280 that is a part of the adaptor 100 either permanently or removably couples to the handlebar of the stroller and 'snaps' into the molded cup 270. This coupling forms a firm but flexible bond as shown in FIG. 3C. The molded cup 270 may be a part of the original molding of the elongated tubes 160/170 or can be of separate construction. Similarly, the fitting 280 can be of the original molding of the elongated tubes 160/170 or of separate construction. In some embodiments, the fitting 280 might actually uncouple from a base as evidenced in an alternative embodiment shown in FIG. 3B. The cups 270 and fittings 280 are, generally, made from a thermoplastic or some other plastic materials—although other materials may also be used—that, when pressure is applied, allows for the fitting 280 to fit into the cup 270. The connection of the fitting 280 and cup 280 forms a 'ball joint,' as shown in FIG. 3C, allowing for the aforementioned up and own movement, adjustability of height and 'snap away' in the event of a fall. In alternative embodiments of the present invention, the fittings and cups may be of varying shapes or sizes.

FIG. 4 shows a more detailed view of the elongated tube 160 of the present invention. Stoppers 230 and 250 are shown on either end of the shock absorber 210. Although stoppers 240 and 260 are not shown in the present figure, they would have a similar construction. A first end 402 of elongated tube 160 (e.g., a male end) fits within a second end 404 of elongated tube 160 (e.g., a female end). Both the male and female end are equipped with the stopper 230 and 250 that allows the shock absorber 210 to absorb and appropriately cushion the transfer of energy from the jogger to the stroller. These stoppers 230 and 250, as noted, also prevent the shock absorber 210 from coming loose inside the elongated tube 160.

The invention has been explained above with reference to an exemplary embodiment. Other embodiments will be apparent to those skilled in the art in light of this disclosure. The present invention may readily be implemented using configurations other than those described in the exemplary embodiments above. Additionally, the present invention may effectively be used in conjunction with systems and apparatus other than the one described above as the exemplary embodiment. Therefore, these and other variations upon the exemplary embodiments are intended to be covered by the present invention, which is limited only by the appended claims.

What is claimed is:

1. A hands-free stroller adaptor apparatus comprising:
    two telescoping, elongated tubes, the elongated tubes being parallel to one another and configured to be situated between a user and a stroller, wherein each of the elongated tubes comprises a male end telescopically fitting within a female end;
    a stopper located inside either the male end or the female end of each of the elongated tubes;
    a shock absorber located adjacent to the stopper in each of the elongated tubes and configured to absorb a portion of energy transferred from the user to the stroller while the user is in motion;
    a molded cup located at a stroller end of each of the elongated tubes and configured for receiving a fitting to form a flexible joint; and
    two fittings coupled to the stroller by two connectors and configured to be inserted into the molded cups to form the flexible joint.

2. The hands-free stroller adaptor apparatus of claim 1 further comprising a horizontal tube portion coupled to the two elongated tubes.

3. The hands-free stroller adaptor apparatus of claim 2 further comprising:
    a waist belt; and
    a flap/pocket further comprising a first edge and a second edge coupled to the waist belt resulting in a portion of the horizontal tube portion being enveloped by the flap/pocket.

4. The hands-free stroller adaptor apparatus of claim 1 wherein the stopper is located inside both the male end and the female end of each of the elongated tubes.

5. The hand-free stroller adaptor apparatus of claim 1 wherein the stopper of each elongated tube is molded as a part of each of the elongated tubes.

6. The hands-free stroller adaptor apparatus of claim 1 wherein the shock absorber comprises a spring.

7. The hands-free stroller adaptor apparatus of claim 1 wherein the shock absorber comprises elastic.

8. The hands-free stroller adaptor apparatus of claim 1 wherein the shock absorber comprises rubber.

9. The hands-free stroller adaptor apparatus of claim 1 wherein the connectors are permanently coupled to the stroller.

10. The hands-free stroller adaptor apparatus of claim 1 wherein the connectors are removably coupled to the stroller.

11. The hands-free stroller adaptor apparatus of claim 2 wherein the horizontal tube portion is permanently coupled to the two elongated tubes.

12. The hands-free stroller adaptor apparatus of claim 3 wherein the waist belt comprises Velcro®.

13. The hands-free stroller adaptor apparatus of claim 3 wherein the waist belt comprises neoprene.

14. The hands-free stroller adaptor apparatus of claim 3 wherein either the first edge or the second edge is permanently coupled to the waist belt.

15. The hands-free stroller adaptor apparatus of claim 3 wherein either the first edge or the second is removably coupled to the waist belt.

16. A hands-free stroller adaptor comprising:
    two elongated tube means configured to be situated between a user and a stroller, wherein each of the elongated tube means comprises a male end telescopically fitting within a female end;
    stopper means located inside either the male end or the female end of each of the elongated tube means;
    shock absorber means located adjacent to the stopper means in each of the elongated tube means and configured to absorb a portion of energy transferred from the user to the stroller while the user is in motion;
    first fitting means located at a stroller end of each of the elongated tube means, wherein the first fitting means are capable of receiving second fitting means to form a flexible joint; and
    second fitting means coupled to the stroller by connector means, and configured for inserting into the first fitting means to form a flexible joint.

* * * * *